United States Patent [19]

Tatum et al.

[11] 3,947,422

[45] Mar. 30, 1976

[54] LOW PROFILE MOLDING COMPOSITION AND PROCESS FOR MAKING SAME

[75] Inventors: Sammy Duane Tatum, Clute; Jerry Marvin Hawkins, Lake Jackson, both of Tex.

[73] Assignee: The Dow Chemical Company, Midland, Mich.

[22] Filed: Aug. 5, 1974

[21] Appl. No.: 494,795

[52] U.S. Cl. ............. 260/42.52; 260/862; 260/879; 260/880 R
[51] Int. Cl.² .......................................... C08K 3/40
[58] Field of Search ............ 260/37 EP, 42.52, 837, 260/862

Primary Examiner—Lewis T. Jacobs
Attorney, Agent, or Firm—Albin R. Lindstrom

[57] ABSTRACT

Better wet-out of glass fiber, lower viscosity of the resin mix which allows for higher filler loadings and better stability are the improvements of this invention. The compositions are prepared by an improved process which comprises mixing a vinyl ester resin having pendant half ester groups and a copolymerizable monomer with a polymeric low profile additive, glass fiber reinforcing material, $CaCO_3$ filler and a viscosity reducing agent comprising a copolymer of a maleic acid half ester of a polyethylene glycol having a molecular weight of about 1450 to 6000 and a monoalkenyl aromatic monomer. A chemical thickening agent such as magnesium oxide may also be added.

13 Claims, No Drawings

LOW PROFILE MOLDING COMPOSITION AND PROCESS FOR MAKING SAME

BACKGROUND

Thermosettable molding compounds containing low profile (also called low shrink) additives have greatly stimulated the reinforced plastics industry. However, the preparation of low profile bulk and sheet molding compounds is troublesome in that high viscosity of the resin mix results in mechanical handling problems, poor wet-out of the reinforcing fibers and product stability problems. Further, in many cases the viscosity of the resin mix limits the amount of filler which can be incorporated therein. Higher filler loadings are desirable both from the ultimate properties imparted to the molded part and from the economic standpoint. The process of this invention overcomes the above problems.

SUMMARY

The improved process of this invention for preparing low profile molding compounds unexpectedly produces lower resin mix viscosity which improves fiber wet-out and properties of the molded article. Higher loadings of fillers can be tolerated because of the lower resin mix viscosities, and more stable molding compounds are produced.

The compositions are prepared by an improved process which comprises combining about 100 parts of a mixture of a terminally unsaturated vinyl ester resin having pendant half ester groups and a copolymerizable monomer, about 0.1 to 5 parts of a viscosity reducing agent, about 5 to 25 parts of a polymeric low profile additive and about 10 to 150 parts of $CaCO_3$. The composition prepared in this manner has a lower resin mix viscosity which allows for higher levels of $CaCO_3$ and easier blending with up to 150 parts of reinforcing glass fibers. Better fiber wet-out is also obtained. Sheet molding compounds and the like may be readily obtained by the addition of a chemical thickening agent such as magnesium oxide.

Essential to obtaining the lower viscosity in the resin mix is the viscosity reducing agent which is a copolymer of a maleic acid half ester of a polyethylene glycol and a monoalkenyl aromatic monomer. The copolymer comprises about 0.5 to 2 moles of the half ester per 100 moles of the aromatic monomer. The glycol has an average molecular weight between about 1450 and 6000.

DESCRIPTION

Basically a bulk molding compound (BMC) or a sheet molding compound (SMC) is a chemically thickened premix resin. Since this definition is commonly employed it will be used herein. A premix resin is simply a mixture of the resin and monomer with an inert filler, glass fiber and a catalyst. The catalyst is included since the resins usually are thermally cured. Other materials such as low profile additives, cure accelerators or promoters, mold release agents and the like may be added. Premix resins are soft, moldable, putty-like solids.

BMC and SMC are generally harder and less tacky than a premix and are more easily handled without changing shape. For convenience, a plastic cover film, e.g. polyethylene, is frequently used with SMC so that layers may be stacked on top of each other, rolled up, etc.

Both the vinyl ester resins of this invention and the method of thickening them to prepare a BMC or SMC are disclosed in U.S. Pat. No. 3,466,259 which is incorporated herein by reference. Since very small amounts of water are needed to activate the thickening reaction only a sufficient amount of an alkaline earth oxide or hydroxide to cause thickening need be added to the compositions of this invention because sufficient water for this purpose is present as a part of the components, e.g. the $CaCO_3$ filler.

In general the amount of said oxides and hydroxides varies from about 1 or 2 parts per 100 parts of resin up to 10 parts and higher. On an equivalent basis about 0.75 to 1 equivalent per equivalent of —COOH up to about 5/1 may be used. Higher amounts, while not usually necessary for thickening, may be added since they merely act as a filler. Preferably the thickening is provided by the addition of magnesium oxide.

Reference is made to two articles to show the state of the art: "Smooth Surface Premix and Sheet Molding Compound Technology" by H. W. Nussbaum et al., SPI, 1970 Technical Conferences, Section 6-E pp. 1–5 and "Thickeners and Low Shrink Additives for Premix and SMC Systems" by F. Fekete, SPI, 1970 Technical Conference, Section 6-D, pp. 1–6.

The molding compounds may be readily cured by exposure to ionizing radiation or by admixture with free radical yielding catalysts such as peroxides, persulfates and the like. With catalysts the cure may be accelerated by heating up to about 200°F or higher. The molding compounds are frequently cured by heating under pressure in a suitable mold.

Reduction in viscosity of the resin mix is important to the attainment of the benefits and advantages of this invention, i.e. improved wet-out of the reinforcing fibers and attainment of higher filler loadings. Essential to the improved process and compositions of this invention is the addition of a copolymer of a maleic acid half ester of a polyethylene glycol and a monoalkenyl aromatic monomer. The average molecular weight of the glycol may vary between about 1450 and 6000 and preferably is about 4000. Monoalkenyl aromatic monomers are well known and include styrene, vinyl toluene, t-butyl styrene, α-methyl styrene and the like. Preferably, the aromatic monomer is styrene.

The copolymers comprise about 0.5 to 2 moles of the maleic acid half ester per 100 moles of the aromatic monomer. Molecular weight can be varied by changing the catalyst level (molecular weight decreases as catalyst level increases) and/or by changing the polymerization temperature (increasing the temperature decreases the molecular weight). The copolymer should have an weight average molecular weight of at least about 15,000 and can be as high as 50,000. A preferred molecular weight range is about 18,000 to 25,000.

In the preparation of the molding compounds, the viscosity of the resin mix which is combined with the glass fibers is the important factor from the standpoint of fiber wet-out and ease of mechanical handling. A very viscous resin mix causes mixing and handling problems and results in poor fiber wet-out. Accordingly, the value of this invention is shown by the reduction in viscosity of the resin mix obtained by the addition of the block copolymer. Surprisingly, the block copolymer viscosity reducing agent is effective in amounts of about 0.1 to 5 parts per 100 parts of resin-monomer, whereas comparable amounts of well known emulsifiers of surfactants are ineffective. Larger amounts may be used but are not usually necessary.

The molding compounds may be prepared by combining the components in any convenient order. Generally, it is preferable to add the viscosity reducing copolymer in the initial mixing stages and before the glass fiber, but the advantages of this invention may be obtained if, for example, all components are simultaneously mixed together. With certain forms of glass fiber such as continuous mats the resin mix is first prepared before impregnating the mat. A skilled worker would be readily able to determine the most convenient order of mixing for his purposes and with his equipment utilizing the disclosure of this invention.

The resins of this invention are terminally unsaturated vinyl ester resins which have been modified to have pendant half ester groups. This half ester provides a free carboxylic acid group, —COOH, which is available for chemical thickening reactions with magnesium oxide and the like. Generally the resins are mixed with styrene for thermally cured reinforced articles but for radiation cure other monomers are more preferable such as the hydroxyalkyl acrylates. Resin-monomer mixtures generally comprise about 25 to 70 weight percent resin and 30 to 75 percent monomer.

Terminally unsaturated vinyl ester resins are first prepared by reacting about equivalent proportions of a polyepoxide resin and an unsaturated monocarboxylic acid wherein

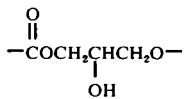

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylate are reacted with polyepoxide resins. Bowen in U.S. Pat. Nos. 3,006,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan and the like may be utilized in place of the dicarboxylic acid. All of the above-described resins which contain the characteristic linkages

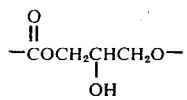

and terminal, polymerizable unsaturated groups, are classified herein as vinyl ester resins. The preparation of vinyl ester resins is fully disclosed in the above patents.

The vinyl ester resin for use herein is modified to have pendant half ester groups by reacting the secondary hydroxyl group as shown in the linkage group above with a dicarboxylic acid anhydride. A variety of saturated and unsaturated anhydrides may be used for this modification, for example maleic, citraconic, aconitic, itaconic, phthalic, terephthalic, tetrabromophthalic, chlorendic and like anhydrides. Proportions of anhydride may range from about 0.1 mole per hydroxyl group up to an amount sufficient to react with each hydroxyl. a reaction temperature from about 25° to 150°C. is suitable and any of the well known vinyl polymerization inhibitors may be added to prevent polymerization during the reaction. Such resins are fully disclosed in U.S. 3,564,074 which is incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

Very smooth (low profile) surfaces are provided by this invention. For this purpose known polymeric additives may be employed. One group of low profile additives which may be employed is the polyalkenyl aromatic thermoplastics. Typical alkenyl aromatic monomers include styrene, vinyl toluene, t-butyl styrene, α-methyl styrene and the like. Mixtures of said monomers mmay be used in preparing the polymerized thermoplastic and it is intended herein that the term "polyalkenyl aromatic thermoplastic" include such polymerized mixtures. Polystyrene is a preferred low profile additive.

A second group of low profile additives, which also impart impact resistance, include polydiene rubbers which contain in polymerized form about 30 to 100 weight percent of a conjugated diene or mixtures thereof and correspondingly from 0 to about 70 percent of a monoalkenyl aromatic monomer of the type hereinbefore described. Said polydiene rubbers may be random, graft or block copolymers all of which and their preparation are well known. Many different polydiene rubbers are available commercially. Typical polydiene rubbers are fully disclosed in U.S. Pat. No. 3,674,893 and are incorporated herein by reference. A preferred additive is a styrene-butadiene block copolymer and mixtures of same with polystyrene.

Conjugated diene monomers include butadiene, isoprene, chloroprene and like monomers, preferably those having 4 to 8 carbon atoms. Butadiene is a preferred monomer, and styrene is a preferred comonomer. Polybutadiene and styrene-butadiene copolymers, especially the block copolymers, are preferred low profile additives.

A third group of low profile additives include the polyalkyl acrylate or methacrylate thermoplastics. Preferably the alkyl group contains from 1 to about 6 carbon atoms. The most commonly used polyalkyl methacrylate is polymethyl methacrylate which is preferred herein. It is understood that mixtures of various alkyl acylate or methacrylate monomers may be used to prepare the thermoplastic polymers.

Other known polymeric low profile additives include polyolefins such as polyethylene, polyvinyl acetates, polycaprolactones, cellulose acetate butyrates and numerous other thermoplastic organic polymeric materials. Mixtures of low profile additives may also be used, e.g., a mixture of polystyrene and a polydiene rubber is a particularly beneficial mixture.

To obtain smooth surfaces it is only necessary to add to the resin-monomer mixture about 5 to 20 parts of said low profile additive per 100 parts of resin-monomer. The amount of the viscosity reducing agent ranges from about 0.1 to 5 parts per 100 parts of resin-monomer and will vary depending on the amount of low profile additive present.

In addition to the low profile additive and viscosity reducing agent about 10 to 150 parts of $CaCO_3$ is added as an inert filler. For making reinforced plastics up to about 150 parts of glass fiber may be added. With most thermosettable resin systems the addition of filler results in a significant viscosity increase which make admixture and wet-out of the glass fiber difficult. However, by the use of the viscosity reducing agent of this invention significantly lower viscosities are obtained which improve the mechanical handling, stability and fiber wet out. After the admixture of filler and glass fiber the composition may then be readily thickened by the addition of magnesium oxide and the like to make a sheet molding compound. Preferably the $CaCO_3$ is present in about 60 to 150 parts per 100 parts of resin-monomer.

Other additives may also be present such as free radical catalysts, e.g., t-butyl perbenzoate, benzoyl peroxide and the like; accelerators such as cobalt naphthanate, N,N-dimethyl toluidine and the like; mold release agents such as metal stearates, fatty alcohol phosphates (Zelec UN) and the like; colorants, etc.

The following non-limiting examples will further illustrate the process of the present invention. All parts and percentages are by weight unless otherwise specified.

EXAMPLE 1

A vinyl ester resin was prepared by first reacting 1.9 parts of bisphenol A with 14 parts of glycidyl polyether of bisphenol A having an epoxide equivalent weight (EEW) of 186–192 (D.E.R. 331) in the presence of a catalytic amount of tetrabutyl phosphonium acetate.acetic acid complex as a 70% solution in methanol to form a higher molecular weight polyepoxide having an EEW of about 275. The latter was then combined with 24.2 parts of an epoxy novolac having an EEW of 175–182 (D.E.N. 438) and 16.6. parts of methacrylic acid. A vinyl polymerization inhibitor and more catalyst was added. The mixture was then heated and reacted until the residual acid content was about 1% or less. The product was a terminally unsaturated vinyl ester.

Modification of the vinyl ester to have pendant half ester groups was obtained by adding 5.5 parts of maleic anhydride and heating the mixture until the acid content was about 5% as —COOH. The modified vinyl ester resin was then cooled and mixed with 31.2 parts of styrene. Phenothiazine was added as an inhibitor.

EXAMPLE 2

This example illustrates one method for preparing the viscosity reducing copolymer of this invention. The maleic acid half ester was prepared by reacting one mole of maleic anhydride with one mole of a polyglycol having an average molecular weight of about 4000 (E-4000). The glycol was first dried by azeotroping off the water using toluene. The reaction is conducted under a nitrogen pad for 1.5 to 3 hours at 100°–110°C. When the acid content ceases to decline the half ester preparation is complete. The resultant half ester is a 50% solution in toluene.

The copolymer was prepared in a suitable reactor by charging 82 gms of the half ester solution, 208.3 gms of styrene and 208.3 gms of toluene. After heating to 100°C, 2.1 gms of benzoyl peroxide (98%) was added and heating continued and controlled at between 110°C and 115°C for about 1 hour. Then an additional 82 gms of half ester solution was added and digested for another 30 minutes at this temperature. The toluene was then stripped off by an air purge which also helped stop any further polymerization. When the reactor temperature reached 140°C the air purge was stopped and a vacuum applied to remove traces of toluene, etc. The temperature dropped to 120°C at which time the copolymer was diluted with 677 gms of styrene (inhibitor added) for subsequent addition to the vinyl ester resin. The copolymer produced was prepared from a total of about 0.02 moles of the half ester and 2 moles of styrene and has a weight average molecular weight of about 29,000.

EXAMPLE 3

The procedure of Example 2 was followed except that the polymerization step was conducted with a higher catalyst level of 1½% based on styrene vs. about 1% in the previous example. The weight average molecular weight was about 23,000.

EXAMPLE 4

Another similar copolymer was prepared at a 2% benzoyl peroxide catalyst level. The weight average molecular weight was about 18,000.

EXAMPLE 5

Similar copolymers may be made by polymerizing from 1 to 2 moles of the half ester per 150 to 300 moles of styrene.

EXAMPLE 6

The effectiveness of the above copolymers in reducing the viscosity of the resin mix is shown by the following example. A formulation for preparing sheet molding compounds was prepared by combining 976 gms of the resin-monomer solution of Example 1, 1.0 part of the above copolymers from Examples 2 and 3 per 100 parts of resin-monomer (abbreviated phr), 15 gms Luperox 118 catalyst (2,5-bis-benzol peroxide), 1.5 gms of USP 245 catalyst (2,5-dimethyl hexane-2,5-diper-2-ethylhexoate), 4.5 gms of additional styrene, 2250 gms of $CaCO_3$ filler (Camel White), 52.5 gms of zinc stearate as a mold release agent and 524 gms of a low profile additive solution. The latter comprised a solution in 62.5 parts of styrene, 25 parts of a styrenebutadiene (40:60) block copolymer and 12.5 parts of polystyrene.

Without any viscosity reducing agent the resin mix had a viscosity of 69,000 cps.

With the copolymer of Example 2 added to the resin mix at 1 phr, its viscosity was reduced to 32,000 cps (over a 50% reduction).

With the copolymer of Example 3 added to the resin mix in the same amount, its viscosity was reduced to 36,000 cps (slightly less than a 50% reduction).

EXAMPLE 7

A sheet molding mixture was prepared by blending the following:
- 6.5 lbs of a resin prepared as in Example 1,
- 3.5 lbs of a low profile additive solution (62.5 parts of styrene, 25 parts of a styrene-butadiene (40/60) block copolymer and 12.5 parts of polystyrene,
- 98.5 grams of an emulsifier prepared as in Example 3,
- 45 grams of tertiarybutyl perbenzoate,
- 4.5 grams of USP 245 catalyst,
- 182 grams of zinc stearate,
- 15 lbs of calcium carbonate filler (Camel White),
- 0.58 lbs of magnesium oxide slurry (60% by weight in Derakane 411-45).

The mix viscosity at 90°F measured 2 hours after mixing was 25,900 cps.

A sheet molding matt was prepared from 75% by weight of the above mixture and 25% OCF 951 - 16 oz continuous strand glass roving chopped to lengths of about one-half inch. The resultant matt had a surface which was slightly moist and a light fuzz when polyethylene film is stripped therefrom.

EXAMPLE 8

The above results can be compared with those obtained in tests with a similar resin and several commercial emulsifiers at 0.5 phr.

| Emulsifier | Viscosity, cps |
| --- | --- |
| none | 76,800 |
| Pluronic L62 | 66,400 |
| Ethoquad C/25 | 80,800 |
| Tween 85 | 64,800 |
| Triton X-100 | 75,300 |
| Pluronic L64 | 70,500 |
| Dowfax 2A1 | 70,400 |

The best of these six commercial surfactants reduced the viscosity only about 15% and in one case the viscosity was actually increased. All the surfactants are identified in McCutcheon's "Detergents and Emulsifiers".

EXAMPLE 9

The effect of the molecular weight of the polyethylene glycol used to prepare the maleic acid half esters was evaluated by preparing a series of copolymers in which the glycol molecular weight was respectively 600, 1000, 1450, 2000, 4000 and 6,000. A copolymer where the glycol was a polypropylene glycol having a molecular weight of about 2000 was also prepared.

| Glycol M.W. | Moles Half Ester to Styrene | Reduction in Viscosity |
| --- | --- | --- |
| 600[1] | 2.5/100 | ineffective |
| 1000[1] | 2.0/100 | ineffective |
| 1450[1] | 1.5/100 | effective |
| 2000[1] | 1/100 | effective |
| 4000[1] | 1/100 | effective |
| 6000[1] | 1.5/100 | effective |
| 2000[2] | 4/100 | ineffective |

[1]polyethylene glycol
[2]polypropylene glycol

Copolymers with a 4000 molecular weight polyglycol appears to be optimum within the claimed range. Polypropylene glycol is not an effective replacement for polyethylene glycol.

What is claimed is:

1. A reduced viscosity low profile molding composition comprising in combination about 100 parts of a mixture of a terminally unsaturated vinyl ester resin having pendant half ester groups and a copolymerizable monomer, about 0.1 to 5 parts of a viscosity reducing agent, about 5 to 25 parts of a polymeric low profile additive and about 10 to 150 parts of an inert filler; wherein said viscosity reducing agent is a copolymer of a maleic acid half ester of a polyethylene glycol having a weight average molecular weight of about 1450 to 6000 and a monoalkenyl aromatic monomer, said copolymer comprising about 0.5 to 2 moles of the half ester per 100 moles of the aromatic monomer and said copolymer having a weight average molecular weight of from about 15,000 to about 50,000; and wherein said vinyl ester resin is prepared by reacting about equivalent amounts of a polyepoxide and an unsaturated monocarboxylic acid and forming pendant half ester groups by further reaction with a dicarboxylic acid anhydride.

2. The composition of claim 1 further comprising a sufficient amount of an alkaline earth oxide or hydride to thicken the composition.

3. The composition of claim 2 further comprising up to 150 parts of a fibrous reinforcing material.

4. The composition of claim 1 wherein said polyglycol has a weight average molecular weight of about 4000.

5. The composition of claim 1 wherein said copolymer is a copolymer of styrene and the half ester.

6. The composition of claim 1 wherein said copolymer is a copolymer of styrene and a maleic acid half ester of a polyethylene glycol having a molecular weight of about 4000, and said copolymer having a weight average molecular weight of from about 18,000 to about 25,000.

7. The composition of claim 6 wherein said low profile additive is a polydiene rubber containing in polymerized form about 30 to 100 weight percent of a conjugated diene and the balance to make 100 percent of a monoalkenyl aromatic monomer.

8. The composition of claim 6 wherein said low profile additive is polystyrene, polybutadiene or a styrene-butadiene block copolymer.

9. The composition of claim 6 wherein said low profile additive is a mixture of polystyrene and a styrene-butadiene block copolymer.

10. An improved process for making glass fiber reinforced sheet molding compounds which comprises combining in any convenient order about 100 parts of a mixture of a terminally unsaturated vinyl ester resin having pendant half ester groups and a copolymerizable monomer, about 0.1 to 5 parts of a viscosity reducing agent, about 5 to 25 parts of a polymeric low profile additive, about 10 to 150 parts of an inert filler and up to about 150 parts of reinforcing glass fiber, wherein said viscosity reducing agent is a copolymer of a maleic acid half ester of a polyethylene glycol having an average molecular weight of about 1450 to 6000 and a monoalkenyl aromatic monomer, said copolymer comprising about 0.5 to 2 moles of the half ester per 100 moles of the aromatic monomer, and wherein said vinyl ester resin is prepared by reacting about equivalent amounts of a polyepoxide and an unsaturated monocarboxylic acid and forming pendant half ester groups by further reaction with a dicarboxylic acid anhydride.

11. The process of claim 10 further comprising the addition of a sufficient amount of an alkaline earth oxide or hydroxide to thicken the composition.

12. The process of claim 11 wherein said filler is $CaCO_3$.

13. The composition of claim 1 wherein said filler is $CaCO_3$.

* * * * *

UNITED STATES PATENT AND TRADEMARK OFFICE
CERTIFICATE OF CORRECTION

PATENT NO. : 3,947,422
DATED : March 30, 1976
INVENTOR(S) : Sammy Duane Tatum and Jerry Marvin Hawkins It is certified that error appears in the above-identified patent and that said Letters Patent are hereby corrected as shown below:

In Col. 3, line 51, delete "3,006,112" and insert -- 3,066,112 --.

In Col. 5, line 38, delete "acylate" and insert -- acrylate --.

Signed and Sealed this

Sixth Day of July 1976

[SEAL]

Attest:

RUTH C. MASON
*Attesting Officer*

C. MARSHALL DANN
*Commissioner of Patents and Trademarks*